No. 876,082. PATENTED JAN. 7, 1908.
T. OTTASON.
JOINTED TONGUE.
APPLICATION FILED NOV. 28, 1906.
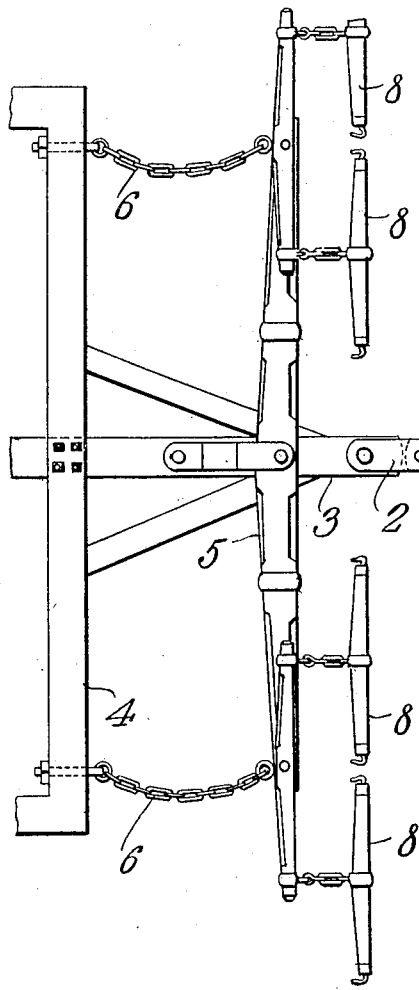
Fig. 1.
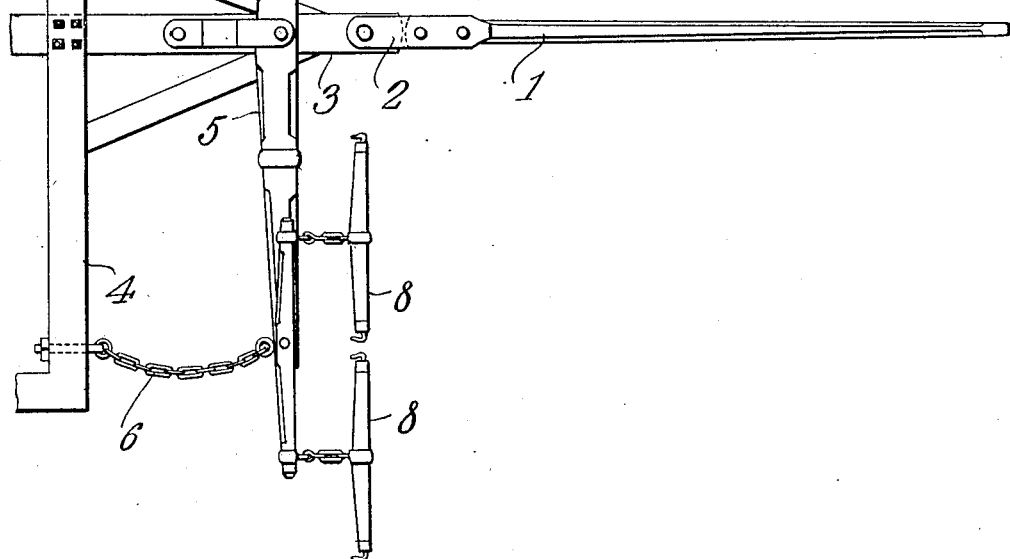
Fig. 2.
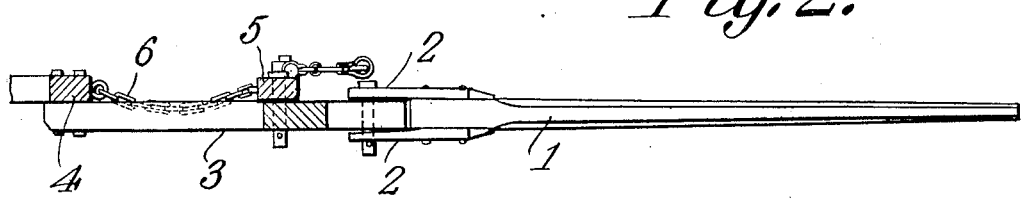
WITNESSES:
Thomas Ottason,
INVENTOR
By
ATTORNEYS

UNITED STATES PATENT OFFICE.

THOMAS OTTASON, OF NEW HAMPTON, IOWA, ASSIGNOR OF ONE-FOURTH TO WAYLAND G. SHAFFER AND ONE-FOURTH TO ALVA H. SHAFFER, BOTH OF NEW HAMPTON, IOWA.

JOINTED TONGUE.

No. 876,082.  Specification of Letters Patent.  Patented Jan. 7, 1908.

Application filed November 28, 1906. Serial No. 345,525.

*To all whom it may concern:*

Be it known that I, THOMAS OTTASON, a citizen of the United States, residing at Rural Route No. 5, New Hampton, in the county of Chickasaw and State of Iowa, have invented a new and useful Jointed Tongue, of which the following is a specification.

This invention has relation to jointed tongues and it consists in the novel construction and arrangement of its parts as hereinafter shown and described.

The object of the invention is to provide a tongue of the character indicated which is adapted to coöperate with a draft equalizer or evener in order to draw heavy implements such as disk harrows or binders over the ground without subjecting the draft animals to lateral vibration from the tongue or lateral threshing from the same as the implement passes over rough ground or is making turns.

With the above object in view the invention consists primarily of a tongue which is horizontally pivoted to a stub tongue. The said stub tongue, in turn, is fixed to the frame of the implement and upon the stub tongue is pivoted the draft equalizer. Stay chains connect the draft equalizer with the frame of the implement so that when the equalizer is turned upon its pivot to a certain degree the stay chains will maintain the equalizer at such a degree with relation to the frame of the implement. That is to say, the scope of movement upon its pivot is limited by the said stay chains.

In the accompanying drawing:—Figure 1 is a top plan view of the device; and Fig. 2 is a vertical sectional view of the same.

The tongue 1 is provided at its end and upon its opposite sides with the metallic plates 2, 2; the said plates receive between them the stub tongue 3 to which the said plates are pivoted. The stub tongue, in turn, is attached to the frame 4 of the implement and is fixed with relation to the same. The draft evener 5 is pivoted upon the stub tongue 3 and the stay chains 6, 6 are fixed at their forward ends to the draft evener 5 at points equidistant from the pivotal point thereof and at their rear ends to the frame 4 of the implement. The draft animals (not shown) are hitched to the trees 8, 8 any number of which may be employed according to the character of draft evener used.

From the foregoing description it is obvious that as the implement passes over rough ground that a great portion of the lateral vibration and threshing of the frame 4 of the implement will be lost in the stub tongue 3 at the pivotal point thereof of juncture with the tongue 1; hence the said tongue 1 will be relieved of such lateral movement. Also, in making turns the tongue 1, after a certain degree of lateral movement, becomes rigid with the frame 4 through engagement with the end of the stub tongue 3; hence in turning to the right or left the inside animals will not be crowded or jammed against the tongue 1.

Having described my invention what I claim as new and desire to secure by Letters Patent is:—

A device of the character described comprising a frame, a stub tongue rigidly fixed thereto, a draft evener pivoted to the stub tongue at a point between the ends thereof, stay-chains connecting the ends of the draft evener with said frame and limiting the movement of the evener on its pivot, trees attached to the evener and a tongue pivotally attached to the end of the stub tongue in advance of the evener and having free lateral swing with relation thereto, said trees, when alined with each other, being alined with the pivot which connects the tongue and stub tongue together.

In testimony that I claim the foregoing as my own, I have hereto affixed my signature in the presence of two witnesses.

THOMAS OTTASON.

Witnesses:
 A. H. SHAFFER,
 T. K. YOUNG.